(12) United States Patent
Domingo et al.

(10) Patent No.: US 9,033,016 B2
(45) Date of Patent: May 19, 2015

(54) TIRE COMPRISING CARCASS REINFORCEMENT WIRES HAVING DIFFERENT PERVIOUSNESSES

(75) Inventors: Alain Domingo, Orleat (FR); Christelle Chaulet, Clermont-Ferrand (FR); Sébastien Noel, Ceyssat (FR); Michael Cogne, Riom (FR)

(73) Assignees: COMPAGNIE GENERALE DES ETABLISSEMENT MICHELIN, Clermont-Forrand (FR); Michelin Recherche et Technique S.A, Granges-Paccot (CH)

( * ) Notice: Subject to any disclaimer, the term of this patent is extended or adjusted under 35 U.S.C. 154(b) by 448 days.

(21) Appl. No.: 13/510,494

(22) PCT Filed: Nov. 8, 2010

(86) PCT No.: PCT/EP2010/066981
§ 371 (c)(1),
(2), (4) Date: Aug. 1, 2012

(87) PCT Pub. No.: WO2011/061082
PCT Pub. Date: May 26, 2011

(65) Prior Publication Data
US 2012/0285602 A1 Nov. 15, 2012

(30) Foreign Application Priority Data
Nov. 17, 2009 (FR) ...................... 09 58091

(51) Int. Cl.
*B60C 9/13* (2006.01)
*B60C 9/08* (2006.01)
(Continued)

(52) U.S. Cl.
CPC ........... *B60C 9/08* (2013.01); *B60C 2009/0483* (2013.04); *B60C 9/13* (2013.01); *B60C 2009/0416* (2013.04); *B60C 9/0007* (2013.04); *D07B 1/062* (2013.01); *D07B 1/0626* (2013.01); *D07B 1/0633* (2013.01);
(Continued)

(58) Field of Classification Search
CPC .... B60C 9/13; B60C 9/04; B60C 2009/0483; B60C 2009/0475; B60C 2009/0416
USPC .......................... 152/451, 536, 548, 556, 557
See application file for complete search history.

(56) References Cited

U.S. PATENT DOCUMENTS 4,363,346 A 12/1982 Pepe
6,837,289 B2 * 1/2005 Cordonnier et al. .......... 152/556
(Continued)

FOREIGN PATENT DOCUMENTS

FR 1 310 491 11/1962
FR 2 795 751 1/2001
(Continued)

*Primary Examiner* — Justin Fischer
*Assistant Examiner* — Robert Dye
(74) *Attorney, Agent, or Firm* — Cozen O'Connor

(57) ABSTRACT

A tire with a radial carcass reinforcement made up of at least one layer of metal reinforcing elements, the tire comprising a crown reinforcement itself capped radially with a tread, the tread being connected to two beads via two sidewalls. At least 70% of the metal reinforcing elements of at least one layer of the carcass reinforcement are non wrapped cables which, in what is known as the air-wicking test, display a flow rate of less than 2 cm3/min, and at least 10% of the metal reinforcing elements of the at least one layer of the carcass reinforcement are cables which, in what is known as the air-wicking test, display a flow rate of greater than 4 cm3/min.

12 Claims, 3 Drawing Sheets

(51) Int. Cl.
   *B60C 9/00* (2006.01)
   *D07B 1/06* (2006.01)
(52) U.S. Cl.
   CPC ............... *D07B 2201/2006* (2013.01); *D07B 2201/2025* (2013.01); *D07B 2201/2028* (2013.01); *D07B 2201/2031* (2013.01); *D07B 2201/2046* (2013.01); *D07B 2201/2059* (2013.01); *D07B 2201/2077* (2013.01); *D07B 2501/2046* (2013.01); *B60C 2200/06* (2013.04); *B60C 2019/008* (2013.04)

(56) References Cited

U.S. PATENT DOCUMENTS

| | | | |
|---|---|---|---|
| 6,935,395 B2 * | 8/2005 | Miyazaki et al. | 152/557 |
| 8,191,348 B2 * | 6/2012 | Barguet et al. | 57/223 |
| 2004/0045652 A1 * | 3/2004 | Vanneste et al. | 152/451 |
| 2006/0124219 A1 * | 6/2006 | Miyazaki et al. | 152/527 |
| 2006/0237110 A1 * | 10/2006 | Barguet et al. | 152/451 |
| 2012/0186715 A1 * | 7/2012 | Toussain et al. | 152/451 |

FOREIGN PATENT DOCUMENTS

| | | | |
|---|---|---|---|
| FR | 2 873 721 | | 2/2006 |
| GB | 990392 | * | 4/1965 |
| JP | 63-256782 | | 10/1988 |
| JP | 64-33288 | | 2/1989 |
| JP | 6 115308 | | 4/1994 |
| JP | 06-115308 | * | 4/1994 |
| JP | 08-127986 | | 5/1996 |
| JP | 2003-025808 | | 1/2003 |
| WO | WO2005/071157 | * | 8/2005 |

* cited by examiner

TIRE COMPRISING CARCASS REINFORCEMENT WIRES HAVING DIFFERENT PERVIOUSNESSES

RELATED APPLICATIONS

This is a U.S. National Phase Application under 35 USC 371 of International Application PCT/EP2010/066981, filed on Nov. 8, 2010.

This application claims the priority of French patent application no.: 09/58091, filed Nov. 17, 2009, the entire content of which is hereby incorporated by reference.

FIELD OF THE INVENTION

The present invention relates to a tire with a radial carcass reinforcement and more particularly to a tire intended to be fitted to vehicles that carry heavy loads and drive at sustained speeds, such as, for example, lorries, tractors, trailers or road buses.

BACKGROUND OF THE INVENTION

In general, in tires of the heavy vehicle tire type, the carcass reinforcement is anchored on both sides in the bead region and is surmounted radially by a crown reinforcement consisting of at least two superposed layers formed of threads or cables that are parallel within each layer and crossed from one layer to the next making angles of between 10° and 45° with the circumferential direction. The said working layers that form the working reinforcement may further be covered by at least one layer known as a protective layer made up of reinforcing elements that are advantageously metal and extensible, known as elastic elements. It may also comprise a layer of metal threads or cables of low extensibility which make an angle of between 45° and 90° with the circumferential direction, this ply, known as the triangulation ply, being situated radially between the carcass reinforcement and the first crown ply known as the working ply, formed of parallel threads or cables at angles of 45° at most in terms of absolute value. The triangulation ply forms, with at least the said working ply, a triangulated reinforcement which, under the various stresses to which it is subjected, deforms little, the essential role of the triangulation ply being to absorb the transverse compression loads which is the object of all the reinforcing elements in the crown region of the tire.

In the case of tires for "heavy" vehicles, one single protective layer is usually present and its protective elements are, in most cases, directed in the same direction and at the same angle in terms of absolute value as those of the reinforcing elements of the radially outermost, and therefore radially adjacent, working layer. In the case of construction plant tires intended to run over fairly uneven ground, the presence of two protective layers is advantageous, the reinforcing elements being crossed from one layer to the next and the reinforcing elements of the radially inner protective layer being crossed with the inextensible reinforcing elements of the radially outer working layer adjacent to the said radially inner protective layer.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it turns during normal use.

A radial or meridian plane is a plane containing the axis of rotation of the tire.

The circumferential median plane or equatorial plane is a plane perpendicular to the axis of rotation of the tire and which divides the tire into two halves.

Certain present-day tires known as "road" tires are intended to run at high speeds and over increasingly long journeys, because of the improvements to the road network and the growth of the motorway network worldwide. All of the conditions under which such a tire is required to run undoubtedly allow an increase in the amount of distance travelled, tire wear being lower, but on the other hand tire endurance is penalized. In order to allow one or even two re-treadings of such tires in order to lengthen their life, it is necessary to preserve a structure and, notably, a carcass reinforcement, the endurance properties of which are sufficient to withstand the said re-treading operations.

The prolonged running of tires constructed in this way, under particularly arduous conditions, effectively causes these tires to reach their limits in terms of endurance.

The elements in the carcass reinforcement are notably subjected to bending and compression stresses during running and these stresses are detrimental to their endurance. The cables that make up the reinforcing elements of the carcass layers are in fact subjected to significant stresses when the tires are running, notably to repeated bendings or variations in curvature which, at the threads, give rise to frictional rubbing and therefore wear, as well as fatigue; this phenomenon is termed "fatigue-fretting".

In order to perform their function of reinforcing the carcass reinforcement of the tire, the said cables have first of all to have good flexibility and high endurance in bending, and this notably entails their threads having a relatively small diameter, preferably less than 0.28 mm, more preferably less than 0.25 mm, and generally smaller than that of the threads used in the conventional cables for tire crown reinforcements.

The cables in the carcass reinforcement are also subject to phenomena known as "fatigue-corrosion" which are due to the very nature of the cables that encourage the passage of, or which even drain, corrosive agents such as oxygen and moisture. Specifically, the air or water that enters the tire, for example upon damage caused by a cut or more simply as a result of the permeability, albeit low, of the interior surface of the tire, may be conducted along the channels formed within the cables as a result of their structure itself.

All these fatigue phenomena which are generally grouped together under the generic heading of "fatigue-fretting-corrosion" cause progressive degeneration of the mechanical properties of the cables and may, for the most arduous running conditions, have an adverse effect on the life of these cables.

In order to improve the endurance of these cables of the carcass reinforcement, it is notably known practice to increase the thickness of the layer of rubber that forms the internal wall of the cavity of the tire in order best to limit the permeability of the said layer. This layer is usually in part made up of butyl to increase the air tightness of the tire. This type of material has the disadvantage of increasing the cost of the tire.

It is also known practice to modify the construction of the said cables in order notably to increase their penetrability by the rubber and thus limit, or even eliminate, the passage of oxidizing agents along the channels formed within the cables. Tires produced in this way have demonstrated problems with air pockets appearing during the manufacture of the tire.

This is because the various stages of manufacture lead to the formation of occluded air pockets. In the case of tires comprising a carcass reinforcement formed of cables the structure of which forms channels capable of conducting air, these air pockets disappear because the air diffuses into the materials and notably through the said channels that exist within the cables. In the case of tires comprising a carcass reinforcement formed of cables the structure of which is highly penetrated by the rubber, these air pockets remain at the end of the manufacturing steps. All that happens is that these air pockets move during the step of curing the tire, these pockets moving towards regions where a low pressure is applied. The movement of the air is along the carcass reinforcement along passages that exist between the reinforcing elements, the layers of rubber compound covering the reinforcing elements forming caved-in regions parallel to the reinforcing elements prior to the stage of curing the tire. These caved-in regions thus allow the air to move slightly according to the pressure applied to the regions at which the air pockets are located. The pressure or the variations in pressure occur notably during the step of curing the tire or alternatively during the shaping step if there is one.

Depending on their location, the appearance of these air pockets is usually unacceptable and may require the tires to be scrapped, as these air pockets are capable of becoming regions of weakness of the tire. The costs of manufacture then become unacceptable simply as a result of the poor production rates.

SUMMARY OF THE INVENTION

One object of the invention is to provide tires for heavy vehicles of the "heavy goods" type, the wear performance of which is maintained for road use and the performance, notably endurance performance, of which is improved, notably with regard to the "fatigue corrosion" or "fatigue fretting corrosion" phenomena, regardless of the running conditions notably in terms of tire inflation, and the cost of manufacture of which remains acceptable.

This object has been achieved according to one aspect of the invention, directed to a tire with a radial carcass reinforcement made up of at least one layer of metal reinforcing elements, the said tire comprising a crown reinforcement itself capped radially with a tread, the said tread being connected to two beads via two sidewalls, at least 70% of the metal reinforcing elements of at least one layer of the carcass reinforcement being non wrapped cables which, in what is known as the air-wicking test, display a flow rate of less than 2 cm3/min, and at least 10% of the metal reinforcing elements of the said at least one layer of the carcass reinforcement being preferably non-wrapped cables which, in what is known as the air-wicking test, display a flow rate of greater than 4 cm3/min.

The test known as the air-wicking test makes it possible to determine the longitudinal permeability to air of the tested cables, by measuring the volume of air passing along a test specimen under constant pressure over a given length of time. The principle of such a test, which is well known to those skilled in the art, is to demonstrate the effectiveness of the treatment of a cable aimed at rendering it impervious to air; it is described, for example, in standard ASTM D2692-98.

The test is performed on cables extracted directly, by stripping, from the vulcanized rubber plies that they reinforce, and which have therefore been penetrated with cured rubber.

The test is performed on 2 cm lengths of cable, therefore coated with its surrounding rubber compound (or coating rubber) in the cured state, as follows: air is injected into the inlet end of the cable at a pressure of 1 bar and the volume of air at the outlet end is measured using a flowmeter (calibrated, for example, from 0 to 500 cm$^3$/min). During measurement, the test specimen of cable is immobilized in a compressed airtight seal (for example a seal made of dense foam or of rubber) so that only the amount of air passing along the cable from one end to the other along the longitudinal axis thereof is taken into consideration by the measurement; the air tightness of the airtight seal itself is checked beforehand using a solid rubber test specimen, which means to say a test specimen containing no cable.

The measured mean air flow rate (averaged over 10 test specimens) is lower the higher the longitudinal impermeability of the cable. Because the measurement is taken with a precision of ±0.2 cm$^3$/min, measured values less than or equal to 0.2 cm$^3$/min are considered to be zero; they correspond to a cable that can be qualified as airtight (completely airtight) along its axis (i.e. in its longitudinal direction).

This air-wicking test is also a simple means of indirectly measuring the degree of penetration of the cable by a rubber compound. The higher the degree of penetration of the cable by the rubber, the lower the measured flow rate.

Cables which, in what is known as the air-wicking test, display a flow rate of less than 2 cm$^3$/min display a degree of penetration greater than 90%.

Cables which, in what is known as the air-wicking test, display a flow rate of less than 20 cm$^3$/min display a degree of penetration greater than 66%.

The degree of penetration of a cable can also be estimated using the method described below. In the case of a layered cable, the method first of all involves eliminating the outer layer on a test specimen of between 2 and 4 cm long in order thereafter to measure, in a longitudinal direction and along a given axis, the sum of the lengths of rubber compound with respect to the length of the test specimen. These measurements of lengths of rubber compound exclude the spaces not penetrated along this longitudinal axis. These measurements are repeated along three longitudinal axes distributed about the periphery of the test specimen and are repeated on five test specimens of cable.

When the cable comprises several layers, the first step of eliminating is repeated with the next layer that has become the outermost one and the lengths of rubber compound are measured along longitudinal axes.

An average of all the ratios of length of rubber compound to length of test specimen thus determined is then calculated in order to define the degree of penetration of the cable.

The inventors have been able to demonstrate that a tire produced in this way according to the invention leads to improvements in terms of the compromise between endurance and costs of manufacture which are highly beneficial. Specifically, the endurance properties of such a tire are equivalent with the solutions mentioned above. The presence of at least 70% of cables in the carcass reinforcement which, in what is known as the air-wicking test, display a flow rate of less than 2 cm$^3$/min means that the risks associated with corrosion can be limited. Further, the presence of at least 10% of cables in the carcass reinforcement which, in what is known as the air-wicking test, display a flow rate of greater than 4 cm$^3$/min allows the air occluded during the manufacture of the tire to be drained away and therefore leads to a higher productivity than that mentioned above and therefore to more beneficial costs. The inventors have been able to demonstrate that having a number of between 10 and 30% of cables in the layer of carcass reinforcement which, in what is known as the air-wicking test, display a flow rate of greater than 4 cm$^3$/min allows the occluded air to encounter a "drain"

either as soon as an air pocket is formed or when the said air pocket begins to move in the direction parallel to the reinforcing elements of the layer of carcass reinforcement during the stages of the manufacture of the tire as was mentioned earlier. The tests performed have confirmed that the results obtained with such cables in these proportions by comparison with the cables which, in what is known as the air-wicking test, display a flow rate of less than 2 cm$^3$/min have little in common with those obtained with carcass reinforcement layers containing only cables which, in what is known as the air-wicking test, display a flow rate of less than 2 cm$^3$/min. Specifically, the presence of at least 10% of such cables has allowed practically none of the tires thus manufactured to be rejected, and has therefore made it possible to bring the individual cost of manufacture down to acceptable levels.

In the case of a carcass reinforcement comprising several layers of reinforcing elements, each of the said layers may be a layer according to the invention. Advantageously, at least the radially external layer comprises at least 70% of unwrapped cables which, in what is known as the air-wicking test, display a flow rate of less than 2 cm$^3$/min and at least 10% of cables, preferably non-wrapped, which, in what is known as the air-wicking test, display a flow rate of greater than 4 cm$^3$/min. This choice is particularly advantageous to ensure that all of the air pockets that form during manufacture of the tire are evacuated, these air pockets essentially appearing at the axially and/or radially exterior surface of the carcass reinforcement while it is being manufactured.

According to one advantageous embodiment of the invention, the said at least 70% of the metal reinforcing elements of at least one layer of the carcass reinforcement are cables of at least two layers, at least one internal layer being sheathed by a layer consisting of a polymer compound such as a crosslinkable or crosslinked rubber compound, preferably based on at least one diene elastomer.

Another aspect of the invention is directed to a tire with a radial carcass reinforcement made up of at least one layer of reinforcing elements, the said tire comprising a crown reinforcement itself capped radially with a tread, the said tread being connected to two beads via two sidewalls, at least 70% of the metal reinforcing elements of at least one layer of the carcass reinforcement being non wrapped cables with at least two layers, at least one internal layer being sheathed with a layer consisting of a polymer compound such as a crosslinkable or crosslinked rubber compound, preferably based on at least one diene elastomer, and at least 10% of the metal reinforcing elements of the said at least one layer of the carcass reinforcement being non wrapped cables which, in what is known as the air-wicking test, display a flow rate of greater than 4 cm3/min.

A "composition based on at least one diene elastomer" means, in the known way, that the composition contains predominantly (i.e., at a level in excess of 50 wt %) this or these diene elastomer(s).

It will be noted that the sheath according to an embodiment of the invention runs continuously around the layer that it covers (which means that this sheath is continuous in the "orthoradial" direction of the cable which is perpendicular to its radius), so as to form a continuous sleeve of a cross section that is advantageously near circular.

It will also be noted that the rubber compound of this sheath is crosslinkable or crosslinked, which means that by definition it comprises a crosslinking system designed to allow the composition to crosslink as it is cured (i.e. to harden rather than to melt); thus, this rubber compound can be qualified as non-meltable, because it cannot be melted whatever the temperature to which it is heated.

A "diene" elastomer or rubber means, in the known way, an elastomer derived at least in part (i.e. a homopolymer or a copolymer) from diene monomers (monomers bearing two carbon-carbon double bonds, conjugated or unconjugated).

Diene elastomers can, in the known way, be classified into two categories, those which are said to be "essentially unsaturated" and those which are said to be "essentially saturated". In general, what is meant here by an "essentially unsaturated" diene elastomer is a diene elastomer derived at least in part from conjugated diene monomers having a level of blocks or units of diene origin (conjugated dienes) that is greater than 15% (mol %). Thus, for example, diene elastomers such as butyl rubbers or copolymers of dienes and of alpha olefins of the EPDM type, do not fall within the above definition and can notably be qualified as "essentially saturated" diene elastomers (in which the level of blocks of diene origin is low or very low, always less than 15%). In the "essentially unsaturated" diene elastomer category a "highly unsaturated" diene elastomer in particular means a diene elastomer having a level of blocks of diene origin (conjugated dienes) which is greater than 50%.

Now that these definitions have been given, a diene elastomer that can be used in the cable of the invention more particularly means:
(a) any homopolymer obtained by polymerizing a conjugated diene monomer having 4 to 12 carbon atoms;
(b) any copolymer obtained by copolymerizing one or more dienes that are conjugated with each other or with one or several aromatic vinyl compound(s) having from 8 to 20 carbon atoms;
(c) a ternary copolymer obtained by copolymerizing ethylene, an α-olefin having 3 to 6 carbon atoms with an unconjugated diene monomer having from 6 to 12 carbon atoms, such as, for example, the elastomers obtained from ethylene, propylene with an unconjugated diene monomer of the abovementioned type such as, notably, 1,4-hexadiene, ethylidene norbornene, dicyclopentadiene;
(d) a copolymer of isobutene and isoprene (butyl rubber) and halogenated, particularly chlorinated or brominated, versions of this type of copolymer.

Although it applies to any type of diene elastomer, the present invention is primarily used with essentially unsaturated diene elastomers, particularly of type (a) or (b) above.

Thus, the diene elastomer is preferably chosen from the group consisting of polybutadienes (BR), natural rubber (NR), synthetic polyisoprenes (IR), the various copolymers of butadiene, the various copolymers of isoprene, and blends of these elastomers. Such copolymers are more preferably chosen from the group consisting of styrene-butadiene copolymers (SBR), butadiene-isoprene copolymers (BIR), stirene-isoprene copolymers (SIR) and stirene-butadiene-isoprene copolymers (SBIR).

For preference again according to the invention, the diene elastomer chosen consists predominantly (which means at a content in excess of 50 phr) of an isoprene elastomer. An "isoprene elastomer" means, in the known way, a homopolymer or a copolymer of isoprene, or, in other words, a diene elastomer chosen from the group consisting of natural rubber (NR), synthetic polyisoprenes (IR), the various copolymers of isoprene, and blends of these elastomers.

According to an advantageous embodiment of the invention, the diene elastomer chosen consists exclusively (which means at a content of 100 phr) of natural rubber, synthetic polyisoprene or a blend of these elastomers, the synthetic polyisoprene having a content (mol %) of cis-1,4 bonds preferably higher than 90% and more preferably still, higher than 98%.

In one particular embodiment of the invention, use could be made of cuts (blends) of this natural rubber and/or these synthetic polyisoprenes with highly unsaturated other diene elastomers, notably with SBR or BR elastomers as mentioned above.

The rubber sheath of the cable of the invention may contain just one or several diene elastomer(s), it being possible for the latter to be used in conjunction with any type of synthetic elastomer other than a diene elastomer, or even with polymers other than elastomers, for example thermoplastic polymers, these polymers other than elastomers then being present as minority polymers.

Although the rubber compound of the said sheath preferably does not contain any plastomer and contains just a diene elastomer (or blend of elastomers) by way of polymer base, the said compound could also contain at least one plastomer in a mass fraction $x_p$ less than the mass fraction $x_e$ of the elastomer(s). In such instances, the following relationship: $0<x_p<0.5$. $x_e$, and more preferably: $0<x_p<0.1$. $x_e$ is preferably satisfied.

For preference, the crosslinking system for the rubber sheath is a system known as a vulcanizing system, which means to say one based on sulphur (or on a sulphur donor) and a primary vulcanization accelerator. Various known secondary accelerators or vulcanization activators may be added to this basic vulcanizing system. The sulphur is used at a preferred content of between 0.5 and 10 phr, more preferably of between 1 and 8 phr, the primary vulcanization accelerator, for example a sulphonamide, is used at a preferred rate of between 0.5 and 10 phr, more preferably of between 0.5 and 5.0 phr.

The rubber compound of the sheath according to the invention contains, in addition to the said crosslinking system, all the habitual ingredients that can be used in rubber compounds for tires, such as reinforcing fillers based on carbon black and/or on an inorganic reinforcing filler such as silica, anti-ageing agents, for example antioxidants, extension oils, plasticizers or agents that make the compositions easier to work in the raw state, methylene acceptors and donors, resins, bismaleimides, known adhesion promoter systems of the "RFS" (resorcinol-formaldehyde-silica) type, or metal salts, notably cobalt salts.

For preference, the composition of the rubber sheath displays, in the crosslinked state, a secant extension modulus at 10% elongation (denoted M10), measured in accordance with standard ASTM D 412, 1998, of less than 20 MPa and more preferably of less than 12 MPa, particularly of between 4 and 11 MPa.

By way of preference, the composition of this sheath is chosen to be identical to the composition used for the rubber matrix that the cables according to the invention are intended to reinforce. Thus, there is no problem of potential incompatibility between the respective materials of the sheath and of the rubber matrix.

For preference, the said composition is based on natural rubber and contains carbon black by way of reinforcing filler, for example a carbon black of (ASTM) grade 300, 600 or 700 (for example N326, N330, N347, N375, N683, N772).

According to an alternative form of the invention, the said at least 70% of cables of at least one layer of the carcass reinforcement which, in what is known as the air-wicking test, display a flow rate of less than 2 cm³/min are layered metal cables of construction [L+M] or [L+M+N] that can be used as reinforcing element in a tire carcass reinforcement, comprising a first layer C1 of L threads of diameter $d_1$ with L ranging from 1 to 4, surrounded by at least one intermediate layer C2 of M threads of diameter $d_2$ wound together in a helix at a pitch $p_2$ with M ranging from 3 to 12, the said layer C2 possibly being surrounded by an external layer C3 of N threads of diameter $d_3$ wound together in a helix at a pitch $p_3$ with N ranging from 8 to 20, and a sheath consisting of a crosslinkable or crosslinked rubber compound based on at least one diene elastomer, covering, in the [L+M] construction, the said first layer C1 and, in the [L+M+N] construction, at least the said layer C2.

For preference, the diameter of the threads of the first layer of the internal layer (C1) is comprised between 0.10 and 0.5 mm, and the diameter of the threads of the external layers (C2, C3) is comprised between 0.10 and 0.5 mm.

For preference also, the pitch of the helix at which the said threads of the external layer (C3) are wound is comprised between 8 and 25 mm.

Within the meaning of the invention, the pitch represents the length, measured parallel to the axis of the cable, at the end of which a thread of this pitch has made a complete turn around the axis of the cable; thus, if the axis is cut through along two planes perpendicular to the said axis and separated by a length equal to the pitch of a thread of a constituent layer of the cable, the axis of this thread in these two planes lies in the same position on both the two circles that correspond to the layer of the thread concerned.

Advantageously the cable exhibits one, and more preferably still, all, of the following features which is/are satisfied:

the layer C3 is a saturated layer, which means that there is not enough space in this layer to add at least one (N+1) thread of diameter $d_3$, N then representing the maximum number of threads that can be wound in the layer around the layer C2;

the sheath of rubber also covers the internal layer C1 and/or separates adjacent threads in the intermediate layer C2;

the sheath of rubber practically covers the radially internal half-circumference of each thread of the layer C3, so that it separates adjacent threads of this layer C3.

In the L+M+N construction according to the invention, the intermediate layer C2 preferably comprises six or seven threads, and the cable according to the invention then has the following preferred features (where $d_1$, $d_2$, $d_3$, $p_2$ and $p_3$ are in mm):

(i) $0.10<d_1<0.28$;
(ii) $0.10<d_2<0.25$;
(iii) $0.10<d_3<0.25$;
(iv) M=6 or M=7;
(v) $5\pi(d_1+d_2)<p_2<p_3<5\pi(d_1+2d_2+d_3)$;
(vi) the threads of the said layers C2, C3 are wound in the same direction of twisting (S/S or Z/Z).

For preference, feature (v) is such that $p_2=p_3$ so that the cable is said to be compact bearing in mind also feature (vi) (threads of layers C2 and C3 wound in the same direction).

According to feature (vi), all the threads of layers C2 and C3 are wound in the same direction of twisting, namely either in the S direction ("S/S" arrangement) or in the Z direction ("Z/Z" arrangement). Winding the layers C2 and C3 in the same direction advantageously makes it possible, in the cable according to the invention, to minimize friction between these two layers C2 and C3 and therefore the wearing of the threads of which they are made (because there is no longer cross contact between the threads).

For preference, the said at least 70% of cables of at least one layer of the carcass reinforcement which, in what is known as the air-wicking test, display a flow rate of less than 2 cm³/min are layered cables of a construction denoted 1+M+N, which means that the internal layer C1 consists of a one single thread.

Advantageously also, the ratios ($d_1/d_2$) are preferably fixed within given limits, according to the number M (6 or 7) of threads in the layer C2, as follows:

for M=6: $0.9<(d_1/d_2)<1.3$;
for M=7: $1.3<(d_1/d_2)<1.6$.

Too low a value of the ratio $d_1/d_2$ may be detrimental to wear between the internal layer and the threads of the layer C2. Too high a value on the other hand may impair the compactness of the cable, for a strength level which in definitive terms is fairly unchanged, and may also impair flexibility; the increased rigidity of the internal layer C1 due to too high a diameter $d_1$ could also be detrimental to the very feasibility of the cable, during cabling operations.

The threads of the layers C2 and C3 may have diameters that are identical or different from one layer to the other. Use is preferably made of threads of the same diameter ($d_2=d_3$), notably with a view to simplifying the cabling method and keeping costs down.

The maximum number $N_{max}$ of threads that can be wound into a single saturated layer C3 around the layer C2 is of course dependent on many parameters (the diameter $d_1$ of the internal layer, the number M and diameter $d_2$ of the threads of the layer C2, the diameter $d_3$ of the threads of the layer C3).

The said at least 70% of cables of at least one layer of the carcass reinforcement which, in what is known as the air-wicking test, display a flow rate of less than 2 cm³/min, are preferably chosen from cables of 1+6+10, 1+6+11, 1+6+12, 1+7+11, 1+7+12 or 1+7+13 structure.

For a better compromise between strength, feasibility and bending strength of the cable, on the one hand, and penetrability by the rubber on the other, it is preferable for the diameters of the threads of the layers C2 and C3, whether or not they are identical, to be comprised between 0.12 mm and 0.22 mm.

In such a case, the following relationships are preferably satisfied:

$0.14<d_1<0.22$;
$0.12<d_2 \leq d_3<0.20$;
$5<p_2 \leq p_3<12$ (low pitches in mm), or alternatively $20<p_2 \leq p_3<30$ (high pitches in mm).

A diameter of less than 0.19 mm makes it possible to reduce the level of stress experienced by the threads in significant variations of curvature of the cables, whereas diameters in excess of 0.16 mm are preferably chosen for reasons notably concerned with the strength of the threads and industrial cost.

One advantageous embodiment for example involves choosing $p_2$ and $p_3$ to be comprised between 8 and 12 mm, advantageously with cables of 1+6+12 structure.

For preference, the rubber sheath has an average thickness ranging from 0.010 mm to 0.040 mm.

In general, the said at least 70% of cables of at least one layer of the carcass reinforcement which, in what is known as the air-wicking test, display a flow rate of less than 2 cm³/min according to the invention can be made using any type of metal thread, notably made of steel, for example carbon-steel threads and/or stainless steel threads. Use is preferably made of a carbon steel although it is of course possible to use other steels or other alloys.

When a carbon steel is used, its carbon content (wt % of steel) is preferably comprised between 0.1% and 1.2%, more preferably from 0.4% to 1.0%; these contents represent a good compromise between the mechanical properties required of the tire and the feasibility of the thread. It should be noted that a carbon content comprised between 0.5% and 0.6% makes such steels ultimately less expensive because they are easier to draw. Another advantageous embodiment of the invention may also, depending on the target application, involve using low-carbon steels, with a content comprised for example between 0.2% and 0.5%, notably because of the lower cost and the greater ease of drawing.

The said at least 70% of cables of at least one layer of the carcass reinforcement which, in what is known as the air-wicking test, display a flow rate of less than 2 cm³/min according to the invention may be obtained using various techniques known to those skilled in the art, for example in two stages, first of all by using an extrusion head to sheath the core or L+M intermediate structure (layers C1+C2), which step is followed in a second stage by a final operation of cabling or twisting the remaining N threads (layer C3) around the layer C2 thus sheathed. The problem of stickiness in the raw state presented by the rubber sheath, during any potential intermediate operations of spooling and unspooling can be solved in a way known to those skilled in the art, for example by using a plastic film interlayer.

According to a first alternative form of embodiment of the invention, the said at least 10% of cables of the carcass reinforcement which, in what is known as the air-wicking test, display a flow rate of greater than 4 cm³/min, are layered, unsheathed cables the external layer of which is saturated.

Within the meaning of the invention, the layers of a cable are said to be "unsheathed" when the cable is manufactured without any polymer blend present on the threads of which it is made. The presence of a polymer blend then does not occur until the time of manufacture of the tire or of prefabricated elements such as a ply made up of polymer blends reinforced by the said cables.

Within the meaning of the invention, an external layer is a layer of N threads of a given diameter which is said to be "saturated" or "complete" if there is not enough space in this layer for the addition of at least one (N+1) thread of diameter identical to that of the N threads.

Another aspect of the invention is directed to a tire with a radial carcass reinforcement made up of at least one layer of reinforcing elements, the said tire comprising a crown reinforcement itself capped radially with a tread, the said tread being connected to two beads via two sidewalls, at least 70% of the metal reinforcing elements of at least one layer of the carcass reinforcement being non wrapped cables with at least two layers, at least one internal layer being sheathed with a layer consisting of a polymer compound such as a crosslinkable or crosslinked rubber compound, preferably based on at least one diene elastomer, and at least 10% of the metal reinforcing elements of the said at least one layer of the carcass reinforcement being layered, unsheathed cables the external layer of which is saturated.

When at least 10% of the metal reinforcing elements of the said at least one layer of the carcass reinforcement are layered, unsheathed cables the external layer of which is saturated, in what is known as the air-wicking test they display a flow rate markedly higher than 4 cm³/min and preferably higher than 20 cm³/min. Such cables allow air and moisture to diffuse during the manufacture of the tire and during use in respect of any air and moisture that originates notably from the cavity.

Such reinforcing elements advantageously represent fewer than 15% of the reinforcing elements of the said at least one layer of the carcass reinforcement. These reinforcing elements which are susceptible to the "fatigue-fretting-corrosion" phenomena must not exist in too great a quantity otherwise they would degrade the endurance performance of the tire which performance is conferred by the presence of the said at least 70% of unwrapped cables of the said at least one layer of the carcass reinforcement which, in what is known as the air-wicking test, display a flow rate of less than 2 cm³/min.

According to a second alternative form of embodiment of the invention, the at least 10% of cables of the carcass reinforcement which, in what is known as the air-wicking test, display a flow rate of greater than 4 cm³/min, are layered, unsheathed cables the external layer of which is unsaturated.

Within the meaning of the invention, an external layer is a layer of N threads which is said to be "unsaturated" or "incomplete" when there is enough space in this layer to add at least one (N+1) thread of a diameter identical to that of the N threads, several of the N threads possibly being in contact with one another.

The invention further proposes a tire with a radial carcass reinforcement made up of at least one layer of reinforcing elements, the said tire comprising a crown reinforcement itself capped radially with a tread, the said tread being connected to two beads via two sidewalls, at least 70% of the metal reinforcing elements of at least one layer of the carcass reinforcement being non-wrapped cables with at least two layers, at least one internal layer being sheathed with a layer consisting of a polymer compound such as a crosslinkable or crosslinked rubber compound, preferably based on at least one diene elastomer, and at least 10% of the metal reinforcing elements of the said at least one layer of the carcass reinforcement being layered, unsheathed cables the external layer of which is unsaturated.

When at least 10% of the metal reinforcing elements of the said at least one layer of the carcass reinforcement are layered, unsheathed cables the external layer of which is unsaturated, in what is known as the air-wicking test, they display a flow rate preferably less than 10 cm³/min. Such cables allow air and moisture to diffuse during the manufacture of the tire like the previous cables notably at the beginning of curing, these cables not yet having been penetrated by the polymer blends surrounding them. During the phase of curing of the tires, the surrounding polymer compounds will be able to penetrate the said cables and thus progressively reduce their flow rate values in what is known as the air-wicking test until they attain the values specified after curing. These cables which have thus been partially penetrated with the polymer compounds also continue to allow air and moisture notably originating from the cavity to diffuse when the tire is in use.

Such reinforcing elements advantageously represent over 20% of the reinforcing elements of the said at least one layer of the carcass reinforcement. These elements need to be present in sufficient quantity so that they can remove air and moisture during manufacture of the tire. In addition, the greater the "unsaturated" nature of the external layer of the cable, or, put differently, the more the cable encourages the penetration of the polymer compounds, the more these will be penetrated, and the more rapidly so during manufacture of the tire, so they will have to be greater in number in order to ensure satisfactory diffusion of air and moisture during manufacture.

As already mentioned previously, the cables in the second alternative form of embodiment also have the advantage over the cables of the first alternative form of embodiment that they are less susceptible to the "fatigue-fretting-corrosion" phenomena.

According to a third alternative form of embodiment of the invention, the said at least 10% of cables of the carcass reinforcement which, in what is known as the air-wicking test, display a flow rate of greater than 4 cm³/min are a combination of layered, unsheathed cables the external layer of which is unsaturated and of layered, unsheathed cables the external layer of which is saturated.

According to either one of these alternative forms of embodiment of the invention, the said at least 10% of cables of the carcass reinforcement are layered, unsheathed cables the external layer of which is unsaturated and/or which are layered, unsheathed cables the external layer of which is saturated, the said cables are preferably layered metal cables of construction [L+M] or [L+M+N] that can be used as reinforcing element in a tire carcass reinforcement, comprising a first layer C1 of L threads of diameter $d_1$ with L ranging from 1 to 4, surrounded by at least one intermediate layer C2 of M threads of diameter $d_2$ wound together in a helix at a pitch $p_2$ with M ranging from 3 to 12, the said layer C2 possibly being surrounded by an external layer C3 of N threads of diameter $d_3$ wound together in a helix at a pitch $p_3$ with N ranging from 8 to 20.

For preference, the diameter of the threads of the first layer of the internal layer (C1) is comprised between 0.10 and 0.5 mm and the diameter of the threads of the external layers (C2, C3) is comprised between 0.10 and 0.5 mm.

Preferably also, the pitch of the helix at which the said threads of the external layer (C3) are wound is comprised between 8 and 25 mm.

Within the meaning of the invention, the pitch represents the length, measured parallel to the axis of the cable, at the end of which a thread of this pitch has made a complete turn around the axis of the cable; thus, if the axis is cut through along two planes perpendicular to the said axis and separated by a length equal to the pitch of a thread of a constituent layer of the cable, the axis of this thread in these two planes lies in the same position on both the two circles that correspond to the layer of the thread concerned.

In the L+M+N construction according to the invention, the intermediate layer C2 preferably comprises six or seven threads, and the cable according to the invention then has the following preferred features (where $d_1$, $d_2$, $d_3$, $p_2$ and $p_3$ are in mm):

(i) $0.10 < d_1 < 0.28$;
(ii) $0.10 < d_2 < 0.25$;
(iii) $0.10 < d_3 < 0.25$;
(iv) M=6 or M=7;
(v) $5\pi(d_1+d_2) < p_2 \leq p_3 < 5\pi(d_1+2d_2+d_3)$;
(vi) the threads of the said layers C2, C3 are wound in the same direction of twisting (S/S or Z/Z).

For preference, feature (v) is such that $p_2 = p_3$ so that the cable is said to be compact bearing in mind also feature (vi) (threads of layers C2 and C3 wound in the same direction).

According to feature (vi), all the threads of layers C2 and C3 are wound in the same direction of twisting, namely either in the S direction ("S/S" arrangement) or in the Z direction ("Z/Z" arrangement). Winding the layers C2 and C3 in the same direction advantageously makes it possible, in the cable according to the invention, to minimize friction between these two layers C2 and C3 and therefore the wearing of the threads of which they are made (because there is no longer cross contact between the threads).

For preference, the said at least 10% of cables of the carcass reinforcement which, in what is known as the air-wicking test, display a flow rate of greater than 4 cm³/min are layered cables of a construction denoted 1+M+N, which means to say that the internal layer C1 consists of one single thread.

Advantageously also, the ratios ($d_1/d_2$) are preferably fixed within given limits, according to the number M (6 or 7) of threads in the layer C2, as follows:
for M=6: $0.9 < (d_1/d_2) < 1.3$;
for M=7: $1.3 < (d_1/d_2) < 1.6$.

Too low a value of the ratio $d_1/d_2$ may be detrimental to wear between the internal layer and the threads of the layer C2. Too high a value on the other hand may impair the compactness of the cable, for a strength level which in definitive terms is fairly unchanged, and may also impair flexibility; the increased rigidity of the internal layer C1 due to too high a diameter $d_1$ could also be detrimental to the very feasibility of the cable, during cabling operations.

The threads of the layers C2 and C3 may have diameters that are identical or different from one layer to the other. Use is preferably made of threads of the same diameter ($d_2=d_3$), notably with a view to simplifying the cabling method and keeping costs down.

The maximum number $N_{max}$ of threads that can be wound into a single saturated layer C3 around the layer C2 is of course dependent on many parameters (the diameter $d_1$ of the internal layer, the number M and diameter $d_2$ of the threads of the layer C2, the diameter $d_3$ of the threads of the layer C3).

The said at least 10% of cables of the carcass reinforcement which, in what is known as the air-wicking test, display a flow rate of greater than 4 cm$^3$/min are preferably chosen from cables of 1+6+10, 1+6+11, 1+6+12, 1+7+11, 1+7+12 or 1+7+13 structure.

For a better compromise between strength, feasibility and bending strength of the cable, it is preferable for the diameters of the threads of the layers C2 and C3, whether or not they are identical, to be comprised between 0.12 mm and 0.22 mm.

In such a case, the following relationships are preferably satisfied:

$0.14<d_1<0.22$;
$0.12<d_2<0.20$;
$5<p_2 \leq p_3<12$ (low pitches in mm), or alternatively $20<p_2 \leq p_3<30$ (high pitches in mm).

A diameter of less than 0.19 mm makes it possible to reduce the level of stress experienced by the threads in significant variations of curvature of the cables, whereas diameters in excess of 0.16 mm are preferably chosen for reasons notably concerned with the strength of the threads and industrial cost.

One advantageous embodiment for example involves choosing $p_2$ and $p_3$ to be comprised between 8 and 12 mm, advantageously with cables of 1+6+12 structure.

In general, the said at least 10% of cables of the carcass reinforcement which, in what is known as the air-wicking test, display a flow rate of greater than 4 cm$^3$/min according to the invention can be made using any type of metal thread, notably made of steel, for example carbon-steel threads and/or stainless steel threads. Use is preferably made of a carbon steel although it is of course possible to use other steels or other alloys.

When a carbon steel is used, its carbon content (wt % of steel) is preferably comprised between 0.1% and 1.2%, more preferably from 0.4% to 1.0%; these contents represent a good compromise between the mechanical properties required of the tire and the feasibility of the thread. It should be noted that a carbon content comprised between 0.5% and 0.6% makes such steels ultimately less expensive because they are easier to draw. Another advantageous embodiment of the invention may also, depending on the target application, involve using low-carbon steels, with a content comprised for example between 0.2% and 0.5%, notably because of the lower cost and the greater ease of drawing.

According to any one of the alternative forms of embodiment of the invention, the number of the said at least 10% of cables of the carcass reinforcement, which are layered, unsheathed cables, the external layer of which is unsaturated and/or which are layered, unsheathed cables the external layer of which is saturated which are adjacent to one another, is preferably less than 3.

Within one layer of carcass reinforcement cables are said to be adjacent within the meaning of the invention when they are separated from one another only by polymer compounds.

Above and beyond three adjacent cables, the risk of tire degradation due to the "fatigue-fretting-corrosion" phenomena would be accentuated. This number of adjacent cables is preferably still zero, which means to say that no two of its cables are ever adjacent but are always separated by at least one cable which, in what is known as the air-wicking test, displays a flow rate of less than 2 cm$^3$/min, notably in the case of layered, unsheathed cables the external layer of which is saturated.

Advantageously according to the invention, the diameter of the said at least 10% of cables of the carcass reinforcement, which are layered, unsheathed cables, the external layer of which is unsaturated and/or which are layered, unsheathed cables the external layer of which is saturated, is comprised between 0.9 and 1.1 times the diameter of the cables which, in what is known as the air-wicking test, display a flow rate of less than 2 cm$^3$/min.

Advantageously also, the breaking strength of the said at least 10% of cables of the carcass reinforcement which are layered, unsheathed cables the external layer of which is unsaturated and/or which are layered, unsheathed cables the external layer of which is saturated, is comprised between 0.9 and 1.1 times the breaking strength of the cables which, in what is known as the air-wicking test, display a flow rate of less than 2 cm$^3$/min.

The breaking strength (maximum load in N) of the metal cables, the rupture strength (in MPa) and elongation at break (total elongation in percent) measurements are performed under tensile testing in accordance with standard ISO 6892, 1984.

According to an alternative form of embodiment of the invention, the crown reinforcement of the tire is formed of at least two working crown layers of inextensible reinforcing elements which are crossed from one layer to the next making angles comprised between 10° and 45° with the circumferential direction.

According to other alternative forms of embodiment of the invention, the crown reinforcement also comprises at least one layer of circumferential reinforcing elements.

A preferred embodiment of the invention is also for the crown reinforcement to be supplemented radially on the outside by at least one supplementary layer, known as a protective layer, of reinforcing elements known as elastic elements, oriented with respect to the circumferential direction at an angle comprised between 10° and 45° and of the same direction as the angle formed by the inextensible elements of the working layer radially adjacent to it.

The protective layer may have an axial width that is less than the axial width of the narrowest working layer. The said protective layer may also have an axial width that is greater than the axial width of the narrowest working layer, such that it covers the edges of the narrowest working layer and, in the case of the radially upper layer being the narrower, such that it is coupled, in the axial continuation of the additional reinforcement, to the to widest working crown layer over an axial width before then, axially on the outside, being decoupled from the said widest working layer by profiled elements at least 2 mm thick. The protective layer formed of elastic reinforcing elements may, in the case mentioned hereinabove, be on the one hand potentially decoupled from the edges of the said narrowest working layer by profiled elements of a thickness appreciably less than the thickness of the profiled elements that separate the edges of the two working layers and on the other hand have an axial width that is less than or greater than the axial width of the widest crown layer.

According to any one of the embodiments of the invention mentioned earlier, the crown reinforcement may be further supplemented, radially on the inside between the carcass reinforcement and the radially internal working layer closest to the said carcass reinforcement, by a triangulation layer of inextensible metal reinforcing elements made of steel which make with the circumferential direction an angle greater than 60° and in the same direction as the angle formed by the reinforcing elements of the radially closest layer of the carcass reinforcement.

BRIEF DESCRIPTION OF THE DRAWINGS

Other details and advantageous features of the invention will become apparent hereinafter from the description of exemplary embodiments of the invention given with reference to FIGS. 1 to 7 which depict.

DETAILED DESCRIPTION OF THE DRAWINGS

In order to make them easier to understand, the figures have not been drawn to scale.

Figure 1:
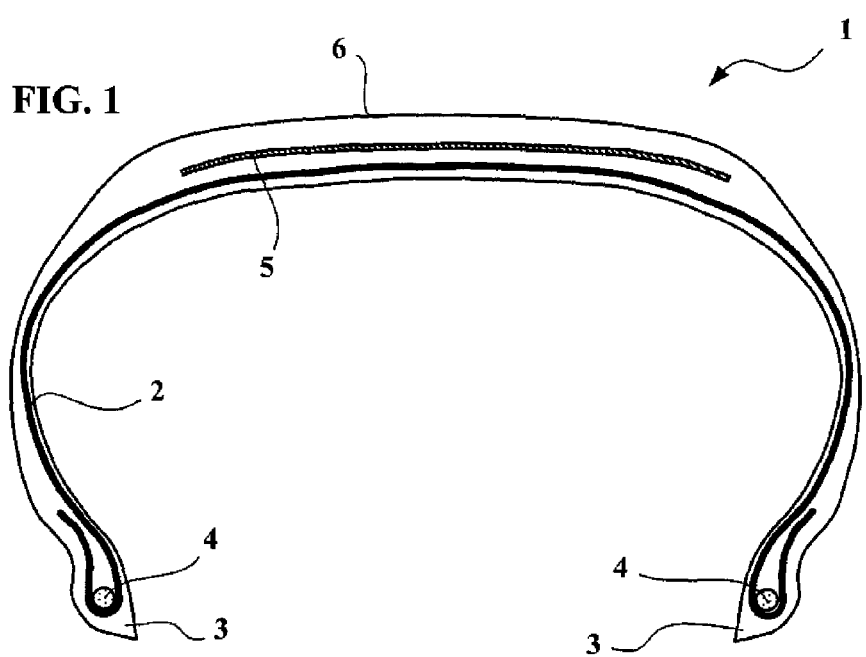
FIG. 1: a meridian view of a diagram of a tire according to one embodiment of the invention.

In FIG. 1, the tire 1, of size 315/70 R 22.5, comprises a radial carcass reinforcement 2 anchored in two beads 3 around bead wires 4. The carcass reinforcement 2 is formed of a single layer of metal cables. The carcass reinforcement 2 is hooped by a crown reinforcement 5, itself capped by a tread 6. The crown reinforcement 5 is formed radially from the inside outwards:
- of a first working layer formed of unwrapped inextensible metal cables 11.35 which are continuous across the entire width of the ply and directed at an angle of 18°,
- of a second working layer formed of unwrapped inextensible metal cables 11.35 which are continuous across the entire width of the ply, directed at an angle of 18° and crossed with the metal cables of the first working layer,
- of a protective layer formed of 6×35 elastic metal cables.

Not all of these layers that make up the crown reinforcement 5 have been depicted in detail in the figures.

Figure 2:
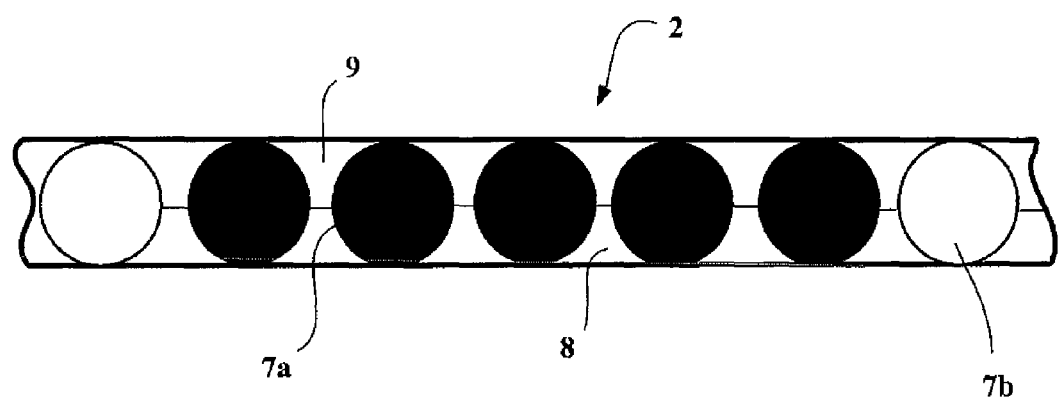
FIG. 2: a schematic sectioned depiction of a layer of carcass reinforcement of the tire of FIG. 1.

FIG. 2 is a schematic section depiction of a layer of carcass reinforcement 2 according to the invention, the section being in a plane perpendicular to the direction in which the reinforcing elements are oriented. This layer is made up of a set of metal cables 7a, 7b directed parallel to one another and held between two layers 8, 9 of rubber compound known as calendaring layer.

The reinforcing elements 7a, depicted as solid circles in FIG. 2, represent the at least 70% of unwrapped cables which, in what is known as the air-wicking test, display a flow rate of less than 2 cm$^3$/min and, in this instance, unwrapped cables with at least two layers, at least one internal layer being sheathed by a layer made of a polymer compound such as a crosslinkable or crosslinked rubber compound. The elements 7b, depicted as open circles in FIG. 2, represent the at least 10% of unwrapped cables which, in what is known as the air-wicking test, display a flow rate of greater than 4 cm$^3$/min.

According to the invention, these at least 10% of unwrapped cables which, in what is known as the air-wicking test, display a flow rate of greater than 4 cm$^3$/min are either unsheathed layered cables, the external layer of which is saturated, or unsheathed layered cables the external layer of which is unsaturated.

The layer of carcass reinforcement of the tire 1 produced according to these FIGS. 1 and 2 comprises reinforcing elements 7a for 90% and elements 7b for 10%, the latter being unsheathed layered cables the external layer of which is saturated.

Figure 3:
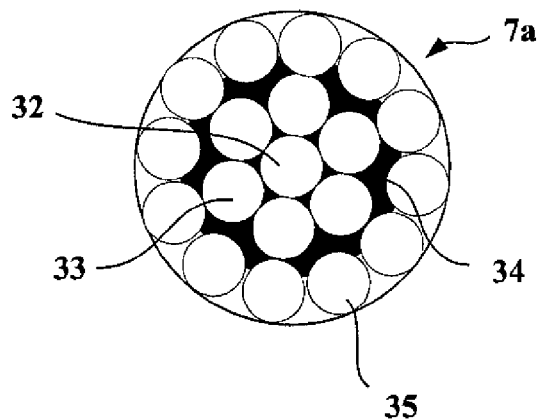
FIG. 3: a schematic depiction of a sectioned view of a first example of cable representing at least 70% of the metal reinforcing elements of at least one layer of carcass reinforcement of the carcass reinforcement of the tire of FIG. 1.

FIG. 3 is a schematic depiction of the cross section through a carcass reinforcement cable 7a of the tire 1 of FIG. 1. This cable 7a is an unwrapped layered cable of structure 1+6+12, made up of a central core strand formed of one thread 32, of an intermediate layer formed of six threads 33, and of an external layer formed of twelve threads 35.

It has the following characteristics (where d and p are given in mm):
structure 1+6+12;
$d_1$=0.20 (mm);
$d_2$=0.18 (mm);
$p_2$=10 (mm)
$d_3$=0.18 (mm);
$p_3$=10 (mm),
$(d_2/d_3)$=1;
where $d_2$, $p_2$, are respectively the diameter and the helix pitch of the intermediate layer and $d_3$ and $p_3$ are respectively the diameter and the helix pitch of the threads of the external layer.

The core of the cable consisting of the central core strand made up of the thread 32 and of the intermediate layer formed of the six threads 33 is sheathed with a rubber compound 34 based on a diene elastomer which is not vulcanized (is in the raw state). The sheathing is performed using an extrusion head on the core made up of the thread 32 surrounded by the six threads 33, and is followed by a final operation of twisting or cabling the 12 threads 35 around the core thus sheathed.

The cable 7a, in what is known as the air-wicking test, as described earlier, displays a flow rate equal to 0 cm$^3$/min which is therefore less than 2 cm$^3$/min. Its penetration by the rubber compound is equal to 95%.

The elastomeric composition of which the rubber sheath 34 is made is produced from a compound as described earlier and in this particular instance has the same formulation, based on natural rubber and on carbon black, as that of the calendaring layers 8, 9 of the carcass reinforcement that the cables are intended to reinforce.

Figure 4:
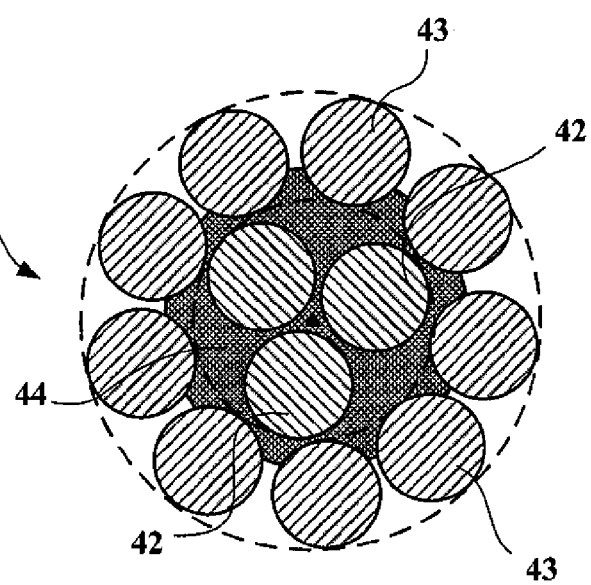
FIG. 4: a schematic depiction of a sectioned view of a second example of cable representing at least 70% of the metal reinforcing elements of at least one layer of carcass reinforcement of the carcass reinforcement of the tire of FIG. 1.

FIG. 4 is a schematic depiction of a cross section through another cable 41 of carcass reinforcement that can be used in a tire according to the invention in place of the cable of FIG. 3, which means to say as the said at least 70% of unwrapped cables having at least two layers, at least one internal layer being sheathed with a layer made of a polymer compound. This cable 41 is an unwrapped layered cable of structure 3+9, made up of a central core formed of a cable consisting of three threads 42 twisted together and of an external layer formed of nine threads 43.

It has the following characteristics (where d and p are given in mm):
structure 3+9;
$d_1$=0.18 (mm);
$p_1$=5 (mm)
$(d_1/d_2)$=1;
$d_2$=0.18 (mm);
$p_2$=10 (mm),
where $d_1$, p1 are respectively the diameter and the helix pitch of the threads of the central core and $d_2$ and $p_2$ are respectively the diameter and the helix pitch of the threads of the external layer.

The central core made up of a cable formed of the three threads 42 has been sheathed with a rubber compound 44 based on a diene elastomer that is not vulcanized (is in the raw state). Sheathing is performed using an extrusion head on the cable 42 followed by a final operation of cabling the 9 threads 43 around the core thus sheathed.

The cable 41, in what is known as the air-wicking test, as described earlier, displays a flow rate equal to 0 $cm^3$/min which is therefore less than 2 $cm^3$/min. Its penetration by the rubber compound is equal to 95%.

Figure 5:
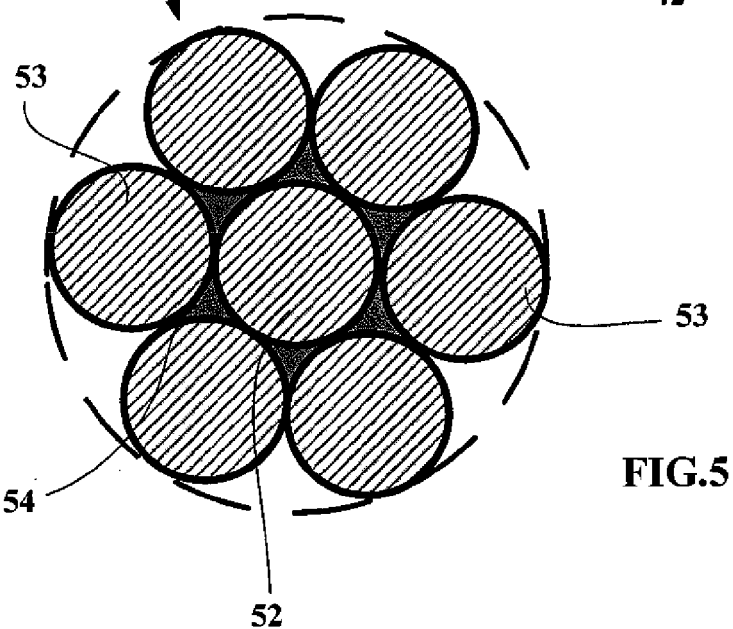
FIG. 5: a schematic depiction of a third example of cable representing at least 70% of the metal reinforcing elements of at least one layer of carcass reinforcement of the carcass reinforcement of the tire of FIG. 1.

FIG. 5 is a schematic depiction of a cross section through another cable 51 of carcass reinforcement that can be used in a tire according to the invention in place of the cable of FIG. 3, which means to say as the said at least 70% of unwrapped cables having at least two layers, at least one internal layer being sheathed with a layer made of a polymer compound. This cable 51 is an unwrapped layered cable of structure 1+6, consisting of a central core strand made up of one thread 52 and of an external layer formed of six threads 53.

It has the following characteristics (where d and p are given in mm):
structure 1+6;
$d_1$=0.200 (mm);
$(d_1/d_2)$=1.14;
$d_2$=0.175 (mm);
$p_2$=10 (mm),
where $d_1$ is the diameter of the core strand and $d_2$ and $p_2$ are respectively the diameter and the helix pitch of the threads of the external layer.

The central core strand made up of the thread 52 has been sheathed with a rubber compound 54 based on a diene elastomer that is not vulcanized (is in the raw state). Sheathing is performed using an extrusion head on the thread 52 followed by a final operation of cabling the 6 threads 53 around the core strand thus sheathed.

The cable 51, in what is known as the air-wicking test, as described earlier, displays a flow rate equal to 0 $cm^3$/min which is therefore less than 2 $cm^3$/min. Its penetration by the rubber compound is equal to 95%.

Figure 6:
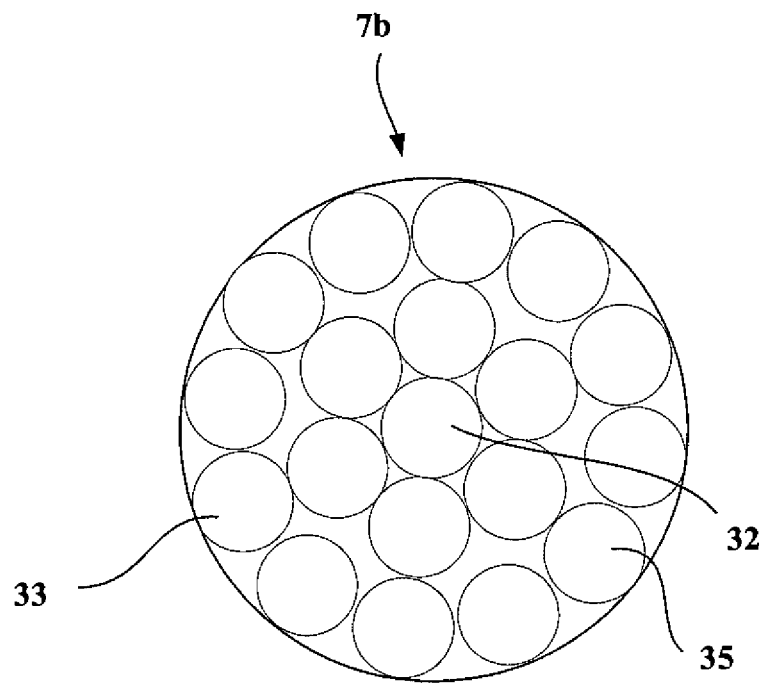
FIG. 6: a schematic depiction of a sectioned view of a first example of cable representing at least 10% of the metal reinforcing elements of at least one layer of carcass reinforcement of the carcass reinforcement of the tire of FIG. 1.

FIG. 6 is a schematic depiction of the cross section of a cable 7b of carcass reinforcement of the tire 1 of FIG. 1. This cable 7b is an unsheathed layered cable the external layer of which is saturated. This is an unwrapped cable of structure 1+6+12 made up of a central core strand formed of one thread 62, of an intermediate layer formed of six threads 63 and of an external layer formed of twelve threads 65.

It has the following characteristics (where d and p are given in mm):
structure 1+6+12;
$d_1$=0.20 (mm);
$d_2$=0.18 (mm);
$p_2$=10 (mm)
$d_3$=0.18 (mm);
$p_3$=10 (mm),
$(d_2/d_3)$=1;
where $d_2$ and $p_2$ respectively are the diameter and the helix pitch of the intermediate layer and $d_3$ and $p_3$ are respectively the diameter and the helix pitch of the threads of the external layer.

This cable 7b is similar to that of FIG. 3 except that the core of the cable made up of the central core strand formed of the thread 62 and of the intermediate layer formed of the six threads 63 is not sheathed with a rubber compound.

This cable 7b is, as specified earlier, a saturated cable which, during the manufacture of the tire, cannot be, or can be only to a small extent, penetrated by the polymer compounds of the calendaring layers 8 and 9.

In what is known as the air-wicking test, as described earlier, it displays a flow equal to 24 $cm^3$/min which is therefore greater than 4 $cm^3$/min.

Figure 7:
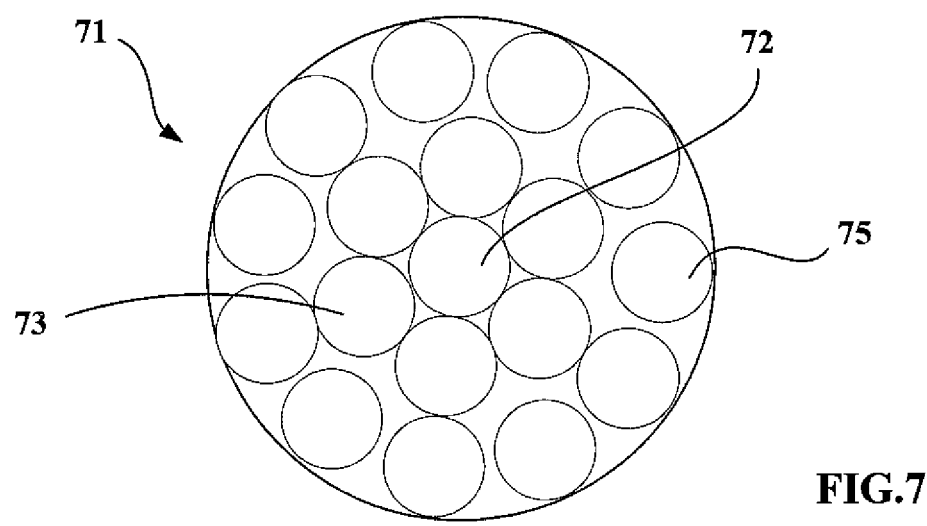
FIG. 7: a schematic depiction of a sectioned view of a second example of cable representing at least 10% of the metal reinforcing elements of at least one layer of carcass reinforcement of the carcass reinforcement of the tire of FIG. 1.

FIG. 7 is a schematic depiction of the cross section of another cable 71 of carcass reinforcement that can be used in a tire according to the invention in place of the cable of FIG. 6, which means as the said at least 10% of cables which, in what is known as the air-wicking test, display a flow rate of greater than 4 $cm^3$/min, the cable 71 of FIG. 7 being an unsheathed layered cable the external layer of which is unsaturated.

This cable 71 is an unsheathed layered cable the external layer of which is unsaturated. This is an unwrapped cable of structure 1+6+11, made up of a central core strand formed of a thread 72, of an intermediate layer formed of six threads 73 and of an external layer formed of eleven threads 71.

It has the following characteristics (where d and p are given in mm):
structure 1+6+11;
$d_1$=0.20 (mm);
$d_2$=0.18 (mm);
$p_2$=7 (mm)
$d_3$=0.18 (mm);
$p_3$=10 (mm),
$(d_2/d_3)$=1;
Where $d_2$, $p_2$ respectively are the diameter and the helix pitch of the intermediate layer and $d_3$ and $p_3$ respectively are the diameter and the helix pitch of the threads of the external layer.

As specified earlier, this cable 71 is an unsaturated cable which when the tire is cured is penetrated by the polymer compounds of the calendaring layers 8 and 9.

In what is known as the air-wicking test, as described earlier, it displays a flow rate of 7 $cm^3$/min which is therefore greater than 4 $cm^3$/min.

To ensure optimum removal of air and moisture during its manufacture, a tire according to the invention produced using the cables 71 contains 72% of cables 7a and 28% of cables 71.

Tests have been carried out on tires produced according to the invention as depicted in FIGS. 1, 2, 3 and 6, and other tests have been carried out on tires referred to as reference tires.

The reference tires differ from the tires according to the invention in that they have a carcass reinforcement the reinforcing elements of which do not have any sheathing layer and comprise only cables 7b as depicted in FIG. 6.

None of the tires thus produced, whether they be the tires according to the invention or even the reference tires, displayed any defect in appearance attributable to the presence of air or moisture.

Endurance tests run on a drum were carried out on a test machine that applied a load of 4415 daN and a speed of 40 km/h to the tires which were inflated and doped with oxygen. The tests were run on tires according to the invention under conditions identical to those applied to the reference tires. Running was halted as soon as the tires displayed damage to the carcass reinforcement.

The tests thus carried out showed that the distances covered in each of these tests were favorable for the tires according to the invention which totalled 300000 km, whereas the reference tires covered only 250 000 km.

Other endurance tests were run on the driven axle of a vehicle applying a load of 3680 daN and a speed of 40 km/h to the tires with the tires inflated to 0.2 bar. The tests were carried out on the tires according to the invention under conditions identical to those applied to the reference tires. The runs covered a distance of 12 000 km or were halted as soon as the tires began to show damage to the carcass reinforcement.

The tires thus produced showed that the distances covered in each of these tests with the tires according to the invention always achieved the full 12 000 km whereas the best result for the reference tires was just 10 000 km.

Other types of tire were also manufactured. These tires differed from the tires according to the invention in that they had a carcass reinforcement containing only cables as depicted in FIG. 3.

It was found that a majority of these tires exhibited defects of appearance on the sidewalls because of the presence of air pockets, making them unsalable. Producing tires according to the invention makes it possible considerably to reduce the proportion of tires that are unsalable as a result of this type of defect, by comparison with the tires the carcass reinforcement of which contains only cables like those depicted in FIG. 3.

The invention claimed is:

1. A tire with a radial carcass reinforcement made up of at least one layer of metal reinforcing elements, the tire comprising a crown reinforcement itself capped radially with a tread, the tread being connected to two beads via two sidewalls, wherein at least 70% of the metal reinforcing elements of at least one layer of the carcass reinforcement are non wrapped cables which, in what is known as the air-wicking test, display a flow rate of less than 2 cm3/min, and wherein at least 10% of the metal reinforcing elements of the at least one layer of the carcass reinforcement are cables which, in what is known as the air-wicking test, display a flow rate of greater than 4 cm3/min.

2. The tire according to claim 1, wherein the at least 70% of the metal reinforcing elements of at least one layer of the carcass reinforcement which, in what is known as the air-wicking test, display a flow rate of less than 2 cm3/min, are cables of at least two layers and wherein at least one internal layer is sheathed by a layer consisting of a polymer compound.

3. The tire according to claim 2, wherein the polymer compound is a crosslinkable or crosslinked rubber compound, based on at least one diene elastomer.

4. The tire according to one of claims 1 to 3, wherein the at least 10% of cables of the carcass reinforcement which, in what is known as the air-wicking test, display a flow rate of greater than 4 cm3/min, are layered unsheathed cables, the external layer of which is saturated.

5. The tire according to one of claims 1 to 3, wherein the at least 10% of cables of the carcass reinforcement which, in what is known as the air-wicking test, display a flow rate of greater than 4 cm3/min, are layered unsheathed cables, the external layer of which is unsaturated.

6. The tire according to one of claims 1 to 3, wherein the at least 10% of cables of the carcass reinforcement which, in what is known as the air-wicking test, display a flow rate of greater than 4 cm3/min are a combination of layered unsheathed cables, the external layer of which is unsaturated and of layered unsheathed cables, the external layer of which is saturated.

7. The tire according to one of claims 1 to 3, wherein the at least 70% of the metal reinforcing elements of at least one layer of the carcass reinforcement are layered metal cables of construction [L+M] or [L+M+N] that can be used as reinforcing element in a tire carcass reinforcement, comprising a first layer C1 of L threads of diameter d1 with L ranging from 1 to 4, surrounded by at least one intermediate layer C2 of M threads of diameter d2 wound together in a helix at a pitch p2 with M ranging from 3 to 12, the said layer C2 possibly being surrounded by an external layer C3 of N threads of diameter d3 wound together in a helix at a pitch p3 with N ranging from 8 to 20, and wherein a sheath consisting of a crosslinkable or crosslinked rubber compound based on at least one diene elastomer, covers, in the [L+M] construction, the first layer C1 and, in the [L+M+N] construction, at least the layer C2.

8. The tire according to claim 7, wherein the diameter of the threads of the first layer C1 is comprised between 0.15 and 0.5 mm, and wherein the diameter of the threads of the layers C2, C3 is comprised between 0.15 and 0.5 mm.

9. The tire according to claim 7, wherein the pitch of the helix at which the threads of the external layer C3 are wound is comprised between 8 and 25 mm.

10. The tire according to claim 3, wherein the diene elasatomer is chosen from the group consisting of polybutadienes, natural rubber, synthetic polyisoprenes, butadiene copolymers, isoprene copolymers and blends of these elastomers.

11. The tire according to claim 3, wherein the crosslinkable or crosslinked rubber compound based on at least one diene elastomer has, in the crosslinked state, a secant extension modulus of less than 20 MPa and, for preference, of less than 12 MPa.

12. The tire according to one of claims 1 to 3, wherein the at least 10% of cables of the carcass reinforcement are layered metal cables of construction [L+M] or [L+M+N] that can be used as reinforcing element in a tire carcass reinforcement, comprising a first layer C1 of L threads of diameter d1 with L ranging from 1 to 4, surrounded by at least one intermediate layer C2 of M threads of diameter d2 wound together in a helix at a pitch p2 with M ranging from 3 to 12, the said layer C2 possibly being surrounded by an external layer C3 of N threads of diameter d3 wound together in a helix at a pitch p3 with N ranging from 8 to 20.

* * * * *